(No Model.)
C. L. PRATT.
REFRIGERATOR CIGAR CASE.
No. 455,412. Patented July 7, 1891.
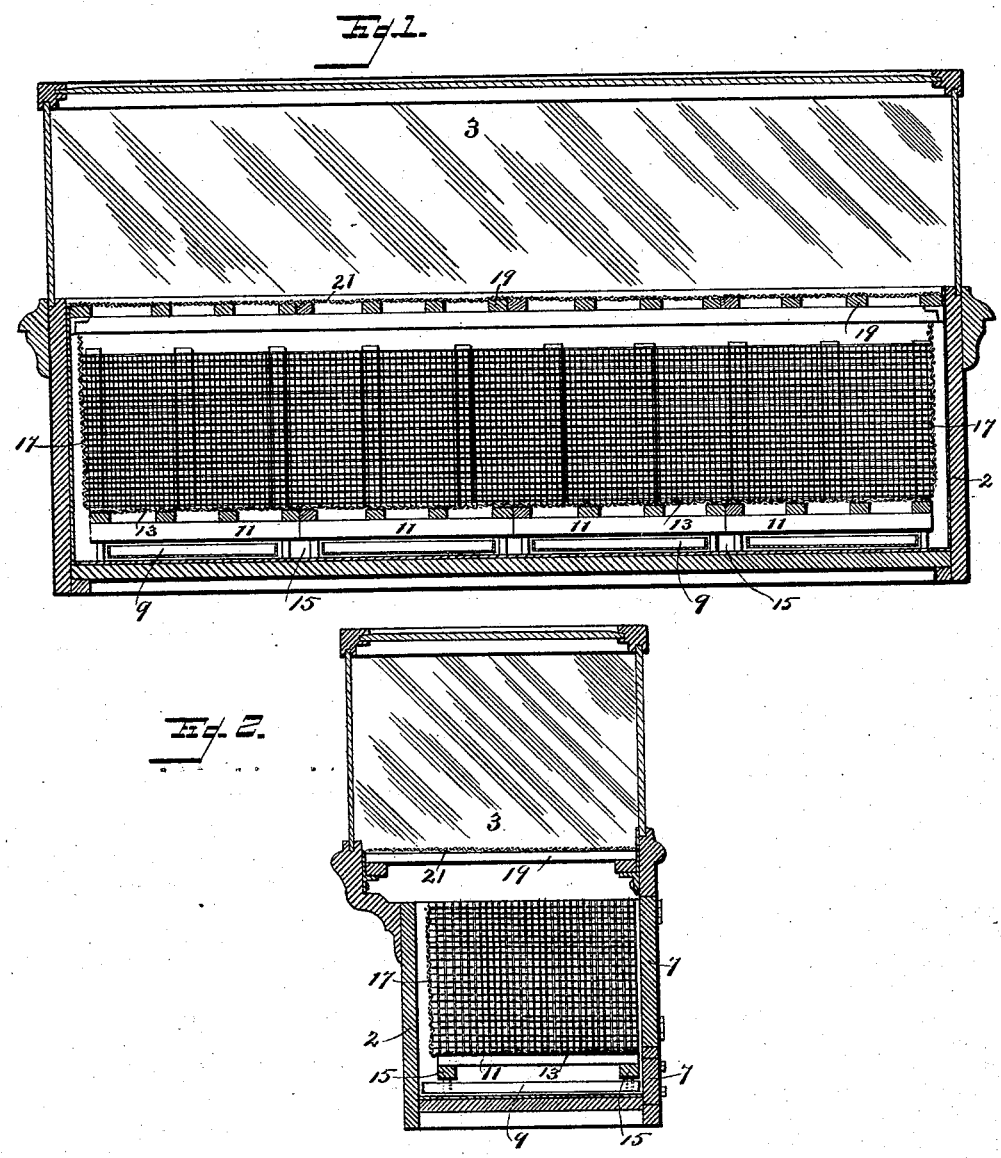
Witnesses.
P. E. Hunt.
Alfred T. Gage.
Inventor.
Charles L. Pratt.
By Paul Merwin
Atty's.

UNITED STATES PATENT OFFICE.

CHARLES L. PRATT, OF MINNEAPOLIS, MINNESOTA.

REFRIGERATOR CIGAR-CASE.

SPECIFICATION forming part of Letters Patent No. 455,412, dated July 7, 1891.

Application filed March 5, 1891. Serial No. 383,821. (No model.)

*To all whom it may concern:*

Be it known that I, CHARLES L. PRATT, of Minneapolis, in the county of Hennepin and State of Minnesota, have invented certain new and useful Improvements in Refrigerator Cigar-Cases, of which the following is a specification.

The object of this invention is to provide an improved cigar-case for packing or storing stocks of cigars and keeping them in a moist condition; and the invention consists, generally, in the construction and combination hereinafter described, and particularly pointed out in the claims.

In the accompanying drawings, Figure 1 is a longitudinal vertical section of a cigar-case embodying my invention. Fig. 2 is a transverse vertical section of the same.

In the drawings, 2 represents the lower portion or body of the case, which is preferably formed of wood and of any suitable size and shape. This portion of the case is open at the top, and above the top thereof is supported a glass case 3, which is also of any suitable size and shape. The lower portion 2 of the case is provided at the rear with suitable door or doors 7, and it also has at the lower part thereof suitable pans 9, which are adapted to hold water. Arranged above the pan 9 is a slatted bottom 11, having a cover 13 of wire-gauze. This bottom is provided, preferably, with suitable supports 15, by which it is held above the pans 9. A vertical wall of wire-netting 17 is arranged along within the casing 2, a short distance from the inner surface of the front wall, and also at a short distance from the inner surface of the end wall. A clear space is thus left around three sides of the lower portion of the casing, which communicates with the space below the slatted bottom, and the vapor from the water in the pans 9 passing up through this space may pass through the wall 17 at any point and may also pass above the top of the lower portion of the casing 2. The upper portion of the casing is also provided with a slatted bottom 19, having a covering of wire-gauze 21, and through this bottom the vapor passes from the lower portion of the casing into the upper portion. It will be seen that with this casing cigars may be packed in either portion, the upper portion of the casing serving as a show-case, in which a single tier of boxes will ordinarily be placed, the lower portion serving for storage of a large number of boxes, which may be piled up promiscuously therein. The moisture from the water in the pan, passing up through the space inside of the walls, will reach the boxes in all parts of the case, and will also pass through the bottom 19 into the upper portion of the case. It will be impossible to pack the boxes so closely in the lower portion of the casing that the moisture cannot pass through the lower part of the casing and reach the upper part of the casing.

I claim as my invention—

1. The combination, with the casing 2, provided with the pans 9, arranged in the bottom thereof, of the slatted bottom 11, arranged above said pans and provided with the wire-gauze covering 13, and the wire-gauze 17, extending from the pans 9 to the top of said casing at a short distance from the inner wall thereof.

2. The combination, with the casing 2, open at its top, of the casing 3, supported upon said casing 2, the pans 9, arranged in the bottom of said casing 2, the slatted bottom 11, arranged above said pans 9 and provided with the wire-gauze covering 13, the wire-gauze 17, extending from said pans 9 to the top of said casing 2 at a short distance from the inner wall thereof, and the slatted bottom 19 in said casing 5, provided with the wire-gauze covering 21, substantially as described.

In testimony whereof I have hereunto set my hand this 23d day of September, 1889.

CHARLES L. PRATT.

In presence of—
A. W. GASKELL,
T. D. MERWIN.